(12) United States Patent
Fan et al.

(10) Patent No.: US 9,596,420 B2
(45) Date of Patent: Mar. 14, 2017

(54) IMAGE SENSOR HAVING PIXELS WITH DIFFERENT INTEGRATION PERIODS

(71) Applicant: Apple Inc., Cupertino, CA (US)

(72) Inventors: Xiaofeng Fan, San Jose, CA (US); Chiajen Lee, Irvine, CA (US); Michael R. Malone, San Jose, CA (US); Anup K. Sharma, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 208 days.

(21) Appl. No.: 14/098,504

(22) Filed: Dec. 5, 2013

(65) Prior Publication Data

US 2015/0163422 A1 Jun. 11, 2015

(51) Int. Cl.
*H04N 5/335* (2011.01)
*H04N 5/353* (2011.01)
*H04N 5/355* (2011.01)

(52) U.S. Cl.
CPC ....... *H04N 5/3535* (2013.01); *H04N 5/35554* (2013.01)

(58) Field of Classification Search
CPC .............................. H04N 5/3535; H04N 5/3569
See application file for complete search history.

(56) References Cited

U.S. PATENT DOCUMENTS

| | | |
|---|---|---|
| 4,686,648 A | 8/1987 | Fossum |
| 5,105,264 A | 4/1992 | Erhardt et al. |
| 5,329,313 A | 7/1994 | Keith |
| 5,396,893 A | 3/1995 | Oberg et al. |
| 5,471,515 A | 11/1995 | Fossum et al. |
| 5,541,402 A | 7/1996 | Ackland |
| 5,550,677 A | 8/1996 | Schofield et al. |
| 5,781,312 A | 7/1998 | Noda |
| 5,841,126 A | 11/1998 | Fossum et al. |
| 5,880,459 A | 3/1999 | Pryor et al. |
| 5,949,483 A | 9/1999 | Fossum et al. |
| 6,008,486 A | 12/1999 | Stam et al. |
| 6,040,568 A | 3/2000 | Caulfield et al. |

(Continued)

FOREIGN PATENT DOCUMENTS

| | | |
|---|---|---|
| CN | 1842138 | 10/2006 |
| CN | 101189885 | 5/2008 |

(Continued)

OTHER PUBLICATIONS

Elgendi, "On the Analysis of Fingertip Photoplethysmogram Signals," *Current Cardiology Reviews*, 2012, vol. 8, pp. 14-25.

(Continued)

*Primary Examiner* — Gary C Vieaux
(74) *Attorney, Agent, or Firm* — Brownstein Hyatt Farber Schreck, LLP

(57) ABSTRACT

An image sensor includes pixels that accumulate charge during a first integration period and pixels that accumulate charge during shorter second integration periods when an image is captured. The pixels having the shorter second integration period accumulate charge at two or more different times during the first integration period. Charge is read out of the pixels associated with the first integration period at the end of the first integration period, while charge is read out of the pixels having the second integration period at the end of each second integration period.

15 Claims, 10 Drawing Sheets

(56) References Cited

U.S. PATENT DOCUMENTS

| | | |
|---|---|---|
| 6,233,013 B1 | 5/2001 | Hosier et al. |
| 6,348,929 B1 | 2/2002 | Acharya et al. |
| 6,448,550 B1 | 9/2002 | Nishimura |
| 6,541,751 B1 | 4/2003 | Bidermann |
| 6,713,796 B1 | 3/2004 | Fox |
| 6,714,239 B2 | 3/2004 | Guidash |
| 6,798,453 B1 | 9/2004 | Kaifu |
| 6,816,676 B2 | 11/2004 | Bianchi et al. |
| 6,905,470 B2 | 6/2005 | Lee et al. |
| 6,982,759 B2 | 1/2006 | Goto |
| 7,091,466 B2 | 8/2006 | Bock |
| 7,133,073 B1 | 11/2006 | Neter |
| 7,259,413 B2 | 8/2007 | Rhodes |
| 7,262,401 B2 | 8/2007 | Hopper et al. |
| 7,271,835 B2 | 9/2007 | Iizuka |
| 7,282,028 B2 | 10/2007 | Kim et al. |
| 7,332,786 B2 | 2/2008 | Altice |
| 7,390,687 B2 | 6/2008 | Boettiger |
| 7,437,013 B2 | 10/2008 | Anderson |
| 7,443,421 B2 | 10/2008 | Stavely et al. |
| 7,502,054 B2 | 3/2009 | Kalapathy |
| 7,525,168 B2 | 4/2009 | Hsieh |
| 7,554,067 B2 | 6/2009 | Zarnowski et al. |
| 7,555,158 B2 | 6/2009 | Lee |
| 7,626,626 B2 | 12/2009 | Panicacci |
| 7,671,435 B2 | 3/2010 | Ahn |
| 7,728,351 B2 | 6/2010 | Shim |
| 7,733,402 B2 | 6/2010 | Egawa et al. |
| 7,742,090 B2 | 6/2010 | Street |
| 7,764,312 B2 | 7/2010 | Ono et al. |
| 7,773,138 B2 | 8/2010 | Lahav et al. |
| 7,786,543 B2 | 8/2010 | Hsieh |
| 7,796,171 B2 | 9/2010 | Gardner |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 5/2011 | Arimoto |
| 7,952,635 B2 | 5/2011 | Lauxtermann |
| 8,026,966 B2 | 9/2011 | Altice |
| 8,032,206 B1 | 10/2011 | Farazi et al. |
| 8,089,524 B2 | 1/2012 | Urisaka |
| 8,094,232 B2 | 1/2012 | Kusaka |
| 8,116,540 B2 | 2/2012 | Dean |
| 8,140,143 B2 | 3/2012 | Picard et al. |
| 8,153,947 B2 | 4/2012 | Barbier et al. |
| 8,159,570 B2 | 4/2012 | Negishi |
| 8,159,588 B2 | 4/2012 | Boemler |
| 8,164,669 B2 | 4/2012 | Compton et al. |
| 8,184,188 B2 | 5/2012 | Yaghmai |
| 8,194,148 B2 | 6/2012 | Doida |
| 8,194,165 B2 | 6/2012 | Border et al. |
| 8,222,586 B2 | 7/2012 | Lee |
| 8,227,844 B2 | 7/2012 | Adkisson |
| 8,233,071 B2 | 7/2012 | Takeda |
| 8,259,228 B2 | 9/2012 | Wei et al. |
| 8,310,577 B1 | 11/2012 | Neter |
| 8,324,553 B2 | 12/2012 | Lee |
| 8,340,407 B2 | 12/2012 | Kalman |
| 8,350,940 B2 | 1/2013 | Smith et al. |
| 8,400,546 B2 | 3/2013 | Itano et al. |
| 8,456,559 B2 | 6/2013 | Yamashita |
| 8,508,637 B2 | 8/2013 | Han et al. |
| 8,514,308 B2 | 8/2013 | Itonaga et al. |
| 8,520,913 B2 | 8/2013 | Dean |
| 8,547,388 B2 | 10/2013 | Cheng |
| 8,575,531 B2 | 11/2013 | Hynecek et al. |
| 8,581,992 B2 | 11/2013 | Hamada |
| 8,594,170 B2 | 11/2013 | Mombers et al. |
| 8,619,163 B2 | 12/2013 | Ogua |
| 8,629,484 B2 | 1/2014 | Ohri et al. |
| 8,634,002 B2 | 1/2014 | Kita |
| 8,648,947 B2 | 2/2014 | Sato et al. |
| 8,723,975 B2 | 5/2014 | Solhusvik |
| 8,754,983 B2 | 6/2014 | Sutton |
| 8,755,854 B2 | 6/2014 | Addison et al. |
| 8,759,736 B2 | 6/2014 | Yoo |
| 8,803,990 B2* | 8/2014 | Smith ............... H04N 5/2355 348/218.1 |
| 8,817,154 B2 | 8/2014 | Manabe et al. |
| 8,902,330 B2 | 12/2014 | Theuwissen |
| 8,908,073 B2 | 12/2014 | Minagawa |
| 8,934,030 B2 | 1/2015 | Kim et al. |
| 8,946,610 B2 | 2/2015 | Iwabuchi et al. |
| 8,982,237 B2 | 3/2015 | Chen |
| 9,054,009 B2 | 6/2015 | Oike et al. |
| 9,066,017 B2 | 6/2015 | Geiss |
| 9,066,660 B2 | 6/2015 | Watson et al. |
| 9,088,727 B2 | 7/2015 | Trumbo |
| 9,099,604 B2 | 8/2015 | Roy |
| 9,100,597 B2 | 8/2015 | Hu |
| 9,131,171 B2 | 9/2015 | Aoki et al. |
| 9,288,404 B2 | 3/2016 | Papiashvili |
| 9,319,611 B2* | 4/2016 | Fan ............... H04N 5/378 |
| 9,344,649 B2* | 5/2016 | Bock ............... H04N 5/35554 |
| 2003/0036685 A1 | 2/2003 | Goodman et al. |
| 2004/0207836 A1* | 10/2004 | Chhibber ............ G01N 21/4738 356/237.4 |
| 2005/0026332 A1 | 2/2005 | Fratti et al. |
| 2005/0151866 A1* | 7/2005 | Ando ............... H04N 5/2355 348/297 |
| 2006/0274161 A1 | 12/2006 | Ing et al. |
| 2007/0263099 A1* | 11/2007 | Motta ............... H04N 5/2354 348/222.1 |
| 2008/0177162 A1 | 7/2008 | Bae et al. |
| 2008/0315198 A1 | 12/2008 | Jung |
| 2009/0096901 A1 | 4/2009 | Bae et al. |
| 2009/0101914 A1 | 4/2009 | Hirotsu et al. |
| 2009/0146234 A1 | 6/2009 | Luo et al. |
| 2009/0201400 A1 | 8/2009 | Zhang et al. |
| 2010/0134631 A1 | 6/2010 | Voth |
| 2011/0080500 A1 | 4/2011 | Wang et al. |
| 2011/0156197 A1 | 6/2011 | Tivarus et al. |
| 2011/0205415 A1 | 8/2011 | Makino et al. |
| 2011/0245690 A1 | 10/2011 | Watson et al. |
| 2012/0092541 A1 | 4/2012 | Tuulos et al. |
| 2012/0098964 A1 | 4/2012 | Oggier et al. |
| 2012/0147207 A1 | 6/2012 | Itonaga |
| 2012/0153125 A1 | 6/2012 | Oike et al. |
| 2012/0188392 A1* | 7/2012 | Smith ............... H04N 5/2355 348/222.1 |
| 2013/0147981 A1 | 6/2013 | Wu |
| 2013/0155271 A1 | 6/2013 | Ishii |
| 2013/0222584 A1 | 8/2013 | Aoki et al. |
| 2013/0293752 A1* | 11/2013 | Peng ............... H04N 5/353 348/295 |
| 2014/0004644 A1 | 1/2014 | Roy |
| 2014/0049683 A1 | 2/2014 | Guenter |
| 2014/0071321 A1* | 3/2014 | Seyama ............. H04N 5/2353 348/308 |
| 2014/0240550 A1 | 8/2014 | Taniguchi |
| 2014/0246568 A1 | 9/2014 | Wan |
| 2014/0247378 A1 | 9/2014 | Sharma et al. |
| 2014/0252201 A1 | 9/2014 | Li et al. |
| 2014/0253768 A1 | 9/2014 | Li |
| 2014/0263951 A1* | 9/2014 | Fan ............... H04N 5/378 250/208.1 |
| 2014/0267855 A1 | 9/2014 | Fan |
| 2014/0347533 A1 | 11/2014 | Toyoda |
| 2014/0354861 A1 | 12/2014 | Pang |
| 2015/0055000 A1* | 2/2015 | Bock ............... H04N 5/37452 348/308 |
| 2015/0163392 A1 | 6/2015 | Malone et al. |
| 2015/0237314 A1 | 8/2015 | Hasegawa |
| 2015/0264241 A1 | 9/2015 | Kleekajai et al. |
| 2015/0264278 A1 | 9/2015 | Kleekajai et al. |
| 2015/0312479 A1 | 10/2015 | McMahon et al. |

(56) References Cited

U.S. PATENT DOCUMENTS

| | | |
|---|---|---|
| 2015/0350575 A1 | 12/2015 | Agranov et al. |
| 2016/0050379 A1 | 2/2016 | Jiang et al. |

FOREIGN PATENT DOCUMENTS

| | | |
|---|---|---|
| CN | 101233763 | 7/2008 |
| CN | 101472059 | 7/2009 |
| CN | 101567977 | 10/2009 |
| CN | 101622859 | 1/2010 |
| CN | 101803925 | 8/2010 |
| CN | 102036020 | 4/2011 |
| CN | 102821255 | 12/2012 |
| CN | 103329513 | 9/2013 |
| CN | 103546702 | 1/2014 |
| EP | 2023611 | 2/2009 |
| EP | 2107610 | 10/2009 |
| EP | 2230690 | 9/2010 |
| JP | 201149697 | 3/2011 |
| JP | 2012019516 | 1/2012 |
| JP | 2012513160 | 6/2012 |
| KR | 20030034424 | 5/2003 |
| KR | 20030061157 | 7/2003 |
| KR | 2008/0069851 | 7/2008 |
| KR | 20100008239 | 1/2010 |
| KR | 20100065084 | 6/2010 |
| KR | 20130074459 | 7/2013 |
| TW | 201301881 | 1/2013 |
| WO | WO 2010/120945 | 10/2010 |
| WO | WO 2012/053363 | 4/2012 |
| WO | WO 2012/088338 | 6/2012 |
| WO | WO 2012/122572 | 9/2012 |
| WO | WO 2013/008425 | 1/2013 |
| WO | WO 2013/179018 | 12/2013 |
| WO | WO 2013/179020 | 12/2013 |

OTHER PUBLICATIONS

Fu, et al., "Heart Rate Extraction from Photoplethysmogram Waveform Using Wavelet Multui-resolution Analysis," *Journal of Medical and Biological Engineering*, 2008, vol. 28, No. 4, pp. 229-232.
Han, et al., "Artifacts in wearable photoplethysmographs during daily life motions and their reduction with least mean square based active noise cancellation method," *Computers in Biology and Medicine*, 2012, vol. 42, pp. 387-393.
Lopez-Silva, et al., "Heuristic Algorithm for Photoplethysmographic Heart Rate Tracking During Maximal Exercise Test," *Journal of Medical and Biological Engineering*, 2011, vol. 12, No. 3, pp. 181-188.
Santos, et al., "Accelerometer-assisted PPG Measurement During Physical Exercise Using the LAVIMO Sensor System," *Acta Polytechnica*, 2012, vol. 52, No. 5, pp. 80-85.
Sarkar, et al., "Fingertip Pulse Wave (PPG signal) Analysis and Heart Rate Detection," *International Journal of Emerging Technology and Advanced Engineering*, 2012, vol. 2, No. 9, pp. 404-407.
Yan, et al., "Reduction of motion artifact in pulse oximetry by smoothed pseudo Wigner-Ville distribution," *Journal of NeuroEngineering and Rehabilitation*, 2005, vol. 2, No. 3, pp. 1-9.
Yousefi, et al., "Adaptive Cancellation of Motion Artifact in Wearable Biosensors," 34th Annual International Conference of the IEEE EMBS, San Diego, California, Aug./Sep. 2012, pp. 2004-2008.
U.S. Appl. No. 14/207,150, filed Mar. 12, 2014, Kleekajai et al.
U.S. Appl. No. 14/207,176, filed Mar. 12, 2014, Kleekajai et al.
U.S. Appl. No. 14/276,728, filed May 13, 2014, McMahon et al.
U.S. Appl. No. 14/292,599, filed May 30, 2014, Agranov et al.
U.S. Appl. No. 14/481,806, filed Sep. 9, 2014, Kleekajai et al.
U.S. Appl. No. 14/481,820, filed Sep. 9, 2014, Lin et al.
U.S. Appl. No. 14/501,429, filed Sep. 30, 2014, Malone et al.
U.S. Appl. No. 14/569,346, filed Dec. 12, 2014, Kestelli et al.
U.S. Appl. No. 14/611,917, filed Feb. 2, 2015, Lee et al.
U.S. Appl. No. 14/462,032, filed Aug. 18, 2014, Jiang et al.
U.S. Appl. No. 14/503,322, filed Sep. 30, 2014, Molgaard.
Feng, et al., "On the Stoney Formula for a Thin Film/Substrate System with Nonuniform Substrate Thickness," Journal of Applied Mechanics, Transactions of the ASME, vol. 74, Nov. 2007, pp. 1276-1281.
Schwarzer, et al., On the determination of film stress from substrate bending: Stoney's formula and its limits, Jan. 2006, 17 pages.
Schwarzer, et al., On the determination of film stress from substrate bending: Stoney's formula and its limits, Jan. 2006, 19 pages.
Aoki et al., "Rolling-Shutter Distortion-Free 3D Stacked Image Sensor with -160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp=&arnumber=6487824.

* cited by examiner

IMAGE SENSOR HAVING PIXELS WITH DIFFERENT INTEGRATION PERIODS

TECHNICAL FIELD

The present invention relates generally to image sensors, and more particularly to image sensors that capture images with pixels having different integration periods.

BACKGROUND

Cameras and other image recording devices often use an image sensor, such as a charge-coupled device (CCD) image sensor or a complementary metal-oxide-semiconductor (CMOS) image sensor to capture images. When an image of a scene is captured, the scene can include objects that can be positioned or illuminated in a way that can make it difficult to represent the objects with acceptable detail. For example, an object in the scene can be positioned in a shadow, or the object can be illuminated by a bright light source, such as the sun.

The dynamic range of an image sensor quantifies the ability of the image sensor to adequately image both high light areas in a scene and low dark areas or shadows in the scene. In general, the dynamic range of an image sensor is less than that of the human eye. The limited dynamic range of an image sensor can result in an image losing details in the brighter areas or in the darker areas of the scene.

A variety of algorithms have been produced to improve the dynamic range of image sensors. One such algorithm varies the integration periods (the time light is collected) of the pixels in the image sensor 100, which produces multiple images of a scene. For example, some pixels 102 can have a longer integration period (T1) while other pixels 104 have a shorter integration period (T2) (see FIG. 1). The pixels 104 with the shorter integration period can better capture the brighter areas in a scene and the pixels 102 with the longer integration period can better capture darker areas in the scene. The charge or signals output from the pixels having the shorter and longer integration periods can be combined to produce a final high dynamic range image that has more detail in the lighter and darker areas of the image.

However, when the integration periods of the pixels are varied, the final high dynamic range image can include undesirable motion artifacts. Since the final high dynamic range image is essentially a combination of two images, one image captured with the shorter integration period and another image captured with the longer integration period, objects in the scene can move in between the times the two images are captured. Thus, the scene represented in the image captured with the shorter integration period can differ from the scene represented in the image captured with the longer integration period. This difference can produce motion artifacts, such as blurring, in the combined final high dynamic range image.

Additionally, the signals obtained from the pixels with the shorter integration period can include a higher percentage of noise compared to the signals from the pixels having the longer integration period. The noise can produce undesirable results in the final image and reduce the image quality.

SUMMARY

In one aspect, an imaging system includes an image sensor having a plurality of pixels, where a first portion of the pixels accumulate charge during a first integration period and a second portion of the pixels accumulate charge for a shorter second integration period. The second portion of the pixels having the shorter second integration period accumulate charge two or more times during the first integration period. Readout circuitry can be operatively connected to the pixels. A processor can be operatively connected to the readout circuitry.

In another aspect, a method for capturing an image can include beginning a first integration period for a first portion of pixels in an image sensor and beginning a shorter second integration period for a second portion of pixels in the image sensor. Charge is read out of the second portion of the pixels during the first integration period at the end of the second integration period. Another second integration period begins for the second portion of the pixels after the readout operation. Charge is then read out of the first and second portions of the pixels at the end of the first integration period. The charge read out at the end of the first integration period can be combined with the charge read out at the end of the earlier second integration period to produce a final image.

In yet another aspect, a method for capturing an image can include beginning a first integration period for a first plurality of pixels in an image sensor, and during the first integration period, beginning a plurality of second integration periods for a second plurality of pixels in the image sensor. The second integration periods are shorter than the first integration period and each second integration period begins at a distinct time within the first integration period. At the end of each second integration period, charge is read out of the second plurality of pixels. At the end of the first integration period, charge is read out of the first plurality of pixels. The charge read out at the end of the first integration period can be combined with the charge read out at the end of each second integration period to produce a final image.

DETAILED DESCRIPTION

Figure 1:
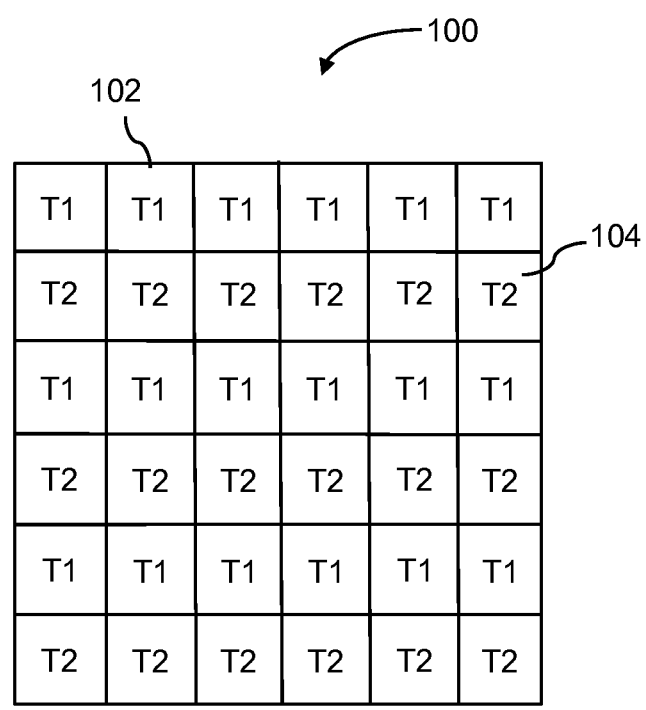
FIG. 1 is simplified illustration of pixels in an image sensor.

Embodiments described herein provide an image sensor that has a first portion of the pixels in the image sensor accumulate charge during a first integration period and a second portion of the pixels accumulate charge during multiple shorter second integration periods. The second integration periods occur during the first integration period. In some embodiments, the second integration periods all include substantially the same amount of time. In other embodiments, the amount of time in at least one second integration period differs from the amount of time in another second integration period.

The timing of the second integration periods can change after N images have been captured, where N is an integer equal to or greater than one. The timing of the multiple second integration periods can be determined as part of a calibration process and/or after N images have been captured. In one embodiment, the timing of the second integration periods can be determined by capturing one or more test images and analyzing at least one of the one or more test images. As one example, the motion, object signal and noise levels in both the bright and dark regions of the test image(s) can be analyzed to determine the timing of the second integration periods.

The distribution or arrangement of the pixels associated with the first and second integration periods can change periodically or at select times. In this manner, some or all of the pixels can be associated with a different integration period. For example, in one embodiment, the pixels associated with the first integration period can be associated with the second integration period and vice versa.

The signals obtained from the pixels associated with the shorter second integration periods can be used for a variety of purposes. The multiple second integration periods can capture additional images or frames at a higher frame rate. In one example, the signals can be combined with the signals read out from the pixels associated with the first integration period to produce a high dynamic range image. The amount of time in each second integration period and/or the start times for the second integration periods (i.e., the timing) can be determined to reduce motion artifacts and/or noise in the high dynamic range image. The multiple images captured by the pixels having the shorter integration periods can be lined up or positioned to cover substantially the entire time period in the first integration period. The multiple images captured by the pixels associated with the second integration periods can be used to control power consumption more intelligently. For example, the multiple images can be analyzed and if the image is steady, readout operations can be reduced for these pixels. As another example, the signals obtained from the pixels associated with the shorter second integration periods can be used with an auto-focus feature.

In one embodiment, a short integration period typically used for high dynamic range imaging (e.g., integration period T2 in FIG. 1) is divided into multiple sub-integration periods and multiple readout operations. The sub-integration periods can have the same or different integration times. When the sub-integration periods have substantially the same integration times, the charge read out of the pixels associated with the sub-integration periods can be averaged together to reduce noise and motion artifacts and/or to obtain a fast frame rate. Additionally or alternatively, when the sub-integration periods have different integration times, the charge or "image" associated with each sub-integration period can be analyzed and used to select the optimum or desired integration time for each pixel, which can improve the signal to noise ratio in high dynamic range images. In some embodiments, the number of sub-integration periods can be pre-set depending on the frame rate, readout speed, and amount of memory available for the image sensor.

Figures 2A, 2B:
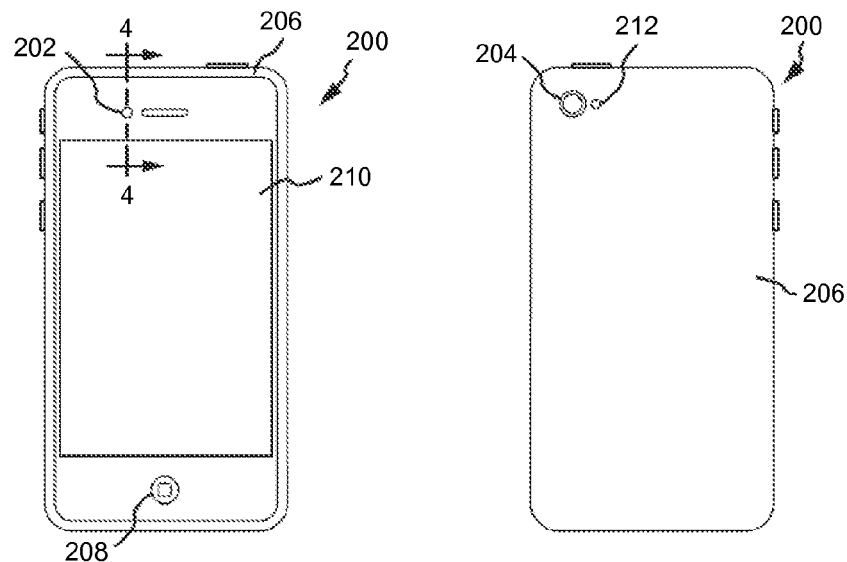
FIGS. 2A-2B depict front and rear views of an example electronic device that can include one or more cameras.

Referring now to FIGS. 2A-2B, there are shown front and rear views of an electronic device that includes one or more cameras. The electronic device 200 includes a first camera 202, a second camera 204, an enclosure 206, an input/output (I/O) member 208, a display 210, and an optional flash 212 or light source for the camera or cameras. The electronic device 200 can also include one or more internal components (not shown) typical of a computing or electronic device, such as, for example, one or more processors, memory components, network interfaces, and so on.

In the illustrated embodiment, the electronic device 200 is implemented as a smart telephone. Other embodiments, however, are not limited to this construction. Other types of computing or electronic devices can include one or more cameras, including, but not limited to, a netbook or laptop computer, a tablet computing device, a wearable computing device or display such as a watch or glasses, a digital camera, a printer, a scanner, a video recorder, and a copier.

As shown in FIGS. 2A-2B, the enclosure 206 can form an outer surface or partial outer surface and protective case for the internal components of the electronic device 200, and may at least partially surround the display 210. The enclosure 206 can be formed of one or more components operably connected together, such as a front piece and a back piece. Alternatively, the enclosure 206 can be formed of a single piece operably connected to the display 210.

The I/O member 208 can be implemented with any type of input or output member. By way of example only, the I/O member 208 can be a switch, a button, a capacitive sensor, or other input mechanism. The I/O member 208 allows a user to interact with the electronic device 200. For example, the I/O member 208 may be a button or switch to alter the volume, return to a home screen, and the like. The electronic device can include one or more input members or output members, and each member can have a single I/O function or multiple I/O functions.

The display 210 can be operably or communicatively connected to the electronic device 200. The display 210 can be implemented with any type of suitable display, such as a retina display or an active matrix color liquid crystal display. The display 210 provides a visual output for the electronic device 200. In some embodiments, the display 210 can function to receive user inputs to the electronic device. For example, the display 210 can be a multi-touch capacitive sensing touchscreen that can detect one or more user inputs.

Figure 3:
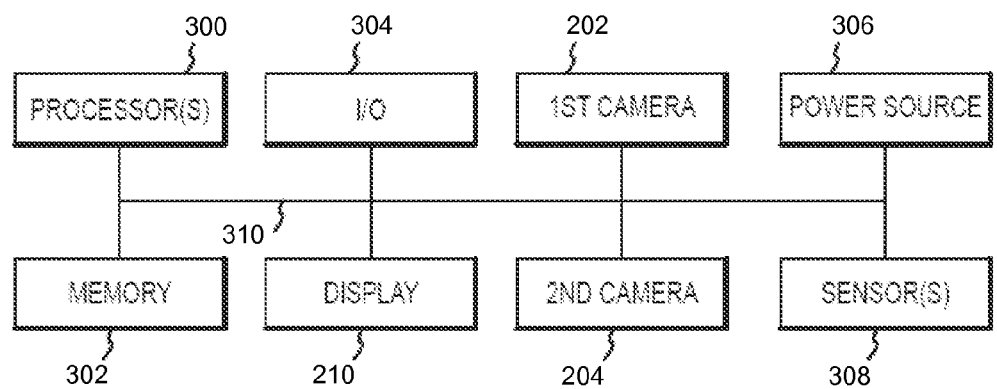
FIG. 3 is an example block diagram of the electronic device shown in FIG. 2.

The electronic device 200 can also include a number of internal components. FIG. 3 illustrates one example of a simplified block diagram of the electronic device 200. The electronic device can include one or more processors 300, storage or memory components 302, input/output interfaces 304, power sources 306, and sensors 308, each of which is discussed in turn below.

The one or more processors 300 can control some or all of the operations of the electronic device 200. The processor(s) 300 can communicate, either directly or indirectly, with substantially all of the components of the electronic device 200. For example, one or more system buses 310 or other communication mechanisms can provide communication between the processor(s) 300, the cameras 202, 204, the display 210, the I/O member 208, and/or the sensors 308. The processor(s) 300 can be implemented as any electronic device capable of processing, receiving, or transmitting data or instructions. For example, the one or more processors 300 can be a microprocessor, a central processing unit (CPU), an application-specific integrated circuit (ASIC), a digital signal processor (DSP), or combinations of multiple such devices. As described herein, the term "processor" is meant to encompass a single processor or processing unit, multiple processors, multiple processing units, or other suitably configured computing element or elements.

The one or more storage or memory devices 302 can store electronic data that can be used by the electronic device 200. For example, the memory 302 can store electrical data or content such as, for example, audio files, document files, timing signals, and image data. The memory 302 can be configured as any type of memory. By way of example only, the memory 302 can be implemented as random access memory, read-only memory, Flash memory, removable memory, or other types of storage elements, in any combination.

The one or more input/output (I/O) interfaces 304 can receive data from a user or one or more other electronic devices. For example, an I/O interface 304 can receive input from the I/O member 208 shown in FIG. 2A. Additionally, an I/O interface 304 can facilitate transmission of data to a user or to other electronic devices. For example, in embodiments where the electronic device 200 is a smart telephone, an I/O interface 304 can receive data from a network or send and transmit electronic signals via a wireless or wired connection. Examples of wireless and wired connections include, but are not limited to, cellular, Wi-Fi, Bluetooth, and Ethernet. In one or more embodiments, an I/O interface 304 supports multiple network or communication mechanisms. For example, an I/O interface 304 can pair with another device over a Bluetooth network to transfer signals to the other device while simultaneously receiving signals from a Wi-Fi or other wired or wireless connection.

The one or more power sources 306 can be implemented with any device capable of providing energy to the electronic device 200. For example, the power source 306 can be a battery or a connection cable that connects the electronic device 200 to another power source such as a wall outlet.

The one or more sensors 308 can by implemented with any type of sensors. Examples sensors include, but are not limited to, audio sensors (e.g., microphones), light sensors (e.g., ambient light sensors), gyroscopes, and accelerometers. The sensors 308 can be used to provide data to the processor 300, which may be used to enhance or vary functions of the electronic device.

Figure 4:
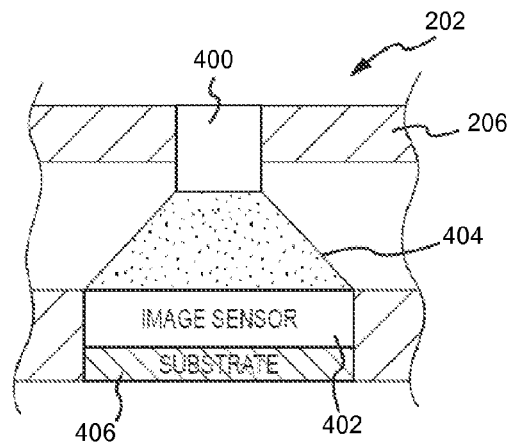
FIG. 4 is a cross-sectional view of the camera 202 shown in FIG. 2A.

As described with reference to FIGS. 2A and 2B, the electronic device 200 includes one or more cameras 202, 204 and optionally a flash 212 or light source for the camera or cameras. FIG. 4 is a simplified cross-section view of the camera 202 taken along line 4-4 in FIG. 2A. Although FIG. 4 illustrates the first camera 202, those skilled in the art will recognize that the second camera 204 can be substantially similar to the first camera 202. In some embodiments, one camera may include a global shutter configured image sensor and one camera can include a rolling shutter configured image sensor. In other examples, one camera can include an image sensor with a higher resolution than the image sensor in the other camera.

The camera 202 includes an imaging stage 400 that is in optical communication with an image sensor 402. The imaging stage 400 is operably connected to the enclosure 206 and positioned in front of the image sensor 402. The imaging stage 400 can include conventional elements such as a lens, a filter, an iris, and a shutter. The imaging stage 400 directs, focuses or transmits light 404 within its field of view onto the image sensor 402. The image sensor 402 captures one or more images of a subject scene by converting the incident light into electrical signals.

The image sensor 402 is supported by a support structure 406. The support structure 406 can be a semiconductor-based material including, but not limited to, silicon, silicon-on-insulator (SOI) technology, silicon-on-sapphire (SOS) technology, doped and undoped semiconductors, epitaxial layers formed on a semiconductor substrate, well regions or buried layers formed in a semiconductor substrate, and other semiconductor structures.

Various elements of imaging stage 400 or image sensor 402 can be controlled by timing signals or other signals supplied from a processor or memory, such as processor 300 in FIG. 3. Some or all of the elements in the imaging stage 400 can be integrated into a single component. Additionally, some or all of the elements in the imaging stage 400 can be integrated with the image sensor 402, and possibly one or more additional elements of the electronic device 200, to form a camera module. For example, a processor or a memory may be integrated with the image sensor 402 in some embodiments.

Figure 5:
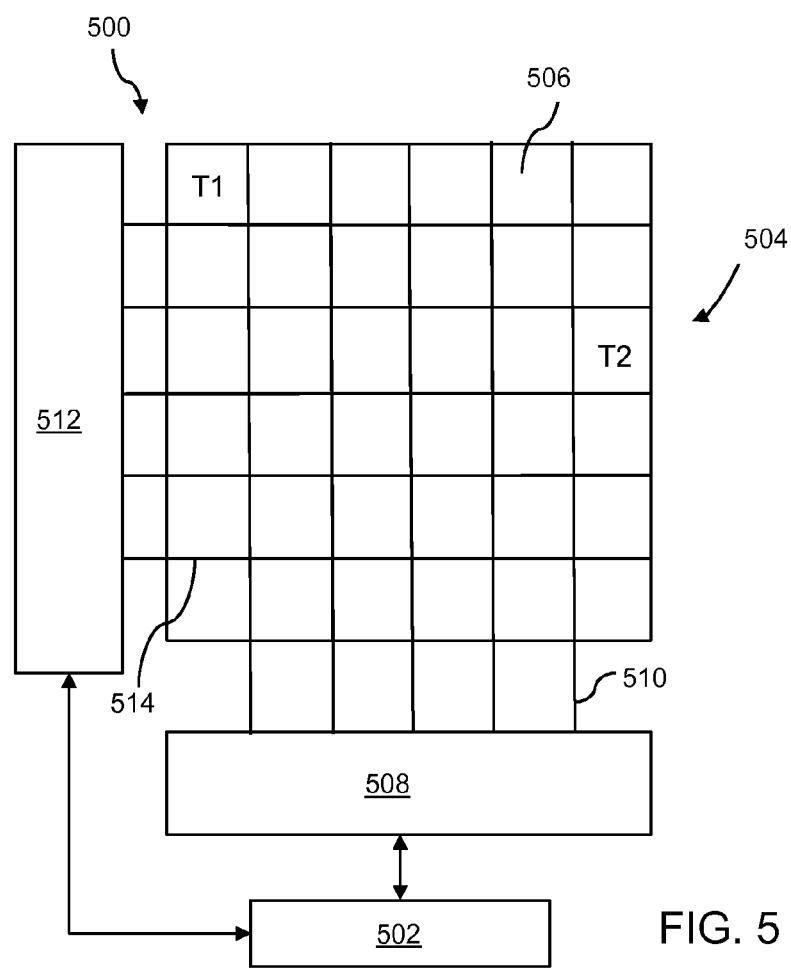
FIG. 5 illustrates a top view of one example of an image sensor suitable for use as image sensor 402 shown in FIG. 4.

Referring now to FIG. 5, there is shown a top view of one example of an image sensor suitable for use as image sensor 402 shown in FIG. 4. The image sensor 500 can include an image processor 502 and an imaging area 504. The imaging area 504 can be implemented as a pixel array that includes pixels 506. In the illustrated embodiment, the pixel array is configured in a row and column arrangement. However, other embodiments are not limited to this configuration. The pixels in a pixel array can be arranged in any suitable configuration, such as, for example, a hexagon configuration.

The imaging area 504 may be in communication with a column select 508 through one or more column select lines 510 and a row select 512 through one or more row select lines 514. The row select 512 selectively selects a particular pixel 506 or group of pixels, such as all of the pixels 506 in a certain row. The column select 508 selectively receives the data output from the select pixels 506 or groups of pixels (e.g., all of the pixels with a particular column).

The row select 512 and/or the column select 508 may be in communication with the image processor 502. In some embodiments, the image processor 502 is adapted to determine the integration periods for the pixels 506, and to change the integration periods periodically or at select times. The image processor 502 can process data from the pixels 506 and provide that data to the processor 300 and/or other components of the electronic device 200. It should be noted that in some embodiments, the image processor 502 can be incorporated into the processor 300 or separate therefrom.

In some embodiments, a portion of the pixels 506 have a first integration period T1 while another portion of the pixels have shorter second integration periods. For example, half of the pixels can accumulate charge for the first integration period while the other half accumulate charge during multiple shorter second integration periods. The pixels with the first and second integration periods can be configured in any given arrangement. As one example, the pixels having the first and second integration periods can be arranged in alternating rows as shown in FIG. 1. In another example, the pixels having the first and second integration periods can be configured in a checkerboard pattern.

As will be described in more detail later, charge that accumulates in the pixels having the shorter second integration period is read from the pixels multiple times during the first integration period. By way of example only, the second integration period can occur at two different times during the first integration period, and the accumulated charge is read out twice from the pixels having the shorter second integration period. At the end of the first integration period, charge is read out of the pixels having the first integration period. As another example, three or more second integration periods can occur during the same first integration period. At the end of each second integration period, the accumulated charge is read out from the pixels associated with the second integration period.

In some embodiments, the charge read out of the pixels associated with the second integration periods can be buffered or stored in a storage device and processed later. The storage device can be included in the image sensor, such as, for example, in an image processor (e.g., 502 in FIG. 5) or in the readout circuitry or column select operatively connected to the column lines (e.g., 508 in FIG. 5). Additionally or alternatively, the storage device can be in the electronic device and operatively connected to the image sensor (e.g., processor 300 in FIG. 3).

Figure 6:
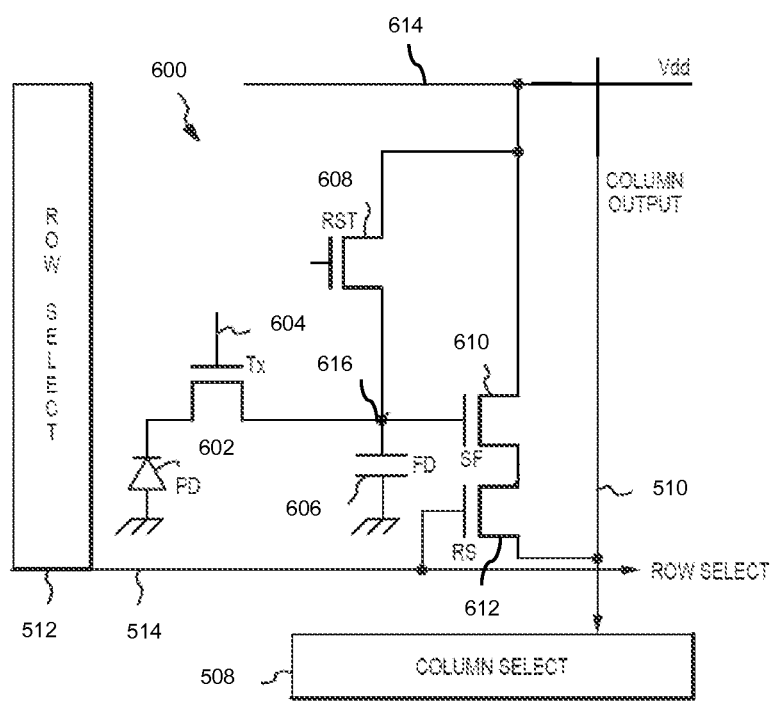
FIG. 6 depicts a simplified schematic view of a pixel that is suitable for use as pixels 506 shown in FIG. 5.

FIG. 6 depicts a simplified schematic view of a pixel that is suitable for use as a pixel 506 shown in FIG. 5. The pixel 600 includes a photodetector (PD) 602, a transfer transistor (TX) 604, a sense region 606, a reset (RST) transistor 608, a readout transistor 610, and a row select (RS) transistor 612. The sense region 606 is represented as a capacitor in the illustrated embodiment because the sense region 606 can temporarily store charge received from the photodetector 602. As described below, after charge is transferred from the photodetector 602, the charge can be stored in the sense region 606 until the gate of the row select transistor 612 is pulsed.

One terminal of the transfer transistor 604 is connected to the photodetector 602 while the other terminal is connected to the sense region 606. One terminal of the reset transistor 608 and one terminal of the readout transistor 610 are connected to a supply voltage (Vdd) 614. The other terminal of the reset transistor 608 is connected to the sense region 606, while the other terminal of the readout transistor 610 is connected to a terminal of the row select transistor 612. The other terminal of the row select transistor 612 is connected to an output line 510.

By way of example only, in one embodiment the photodetector 602 is implemented as a photodiode (PD) or pinned photodiode, the sense region 606 as a floating diffusion (FD), and the readout transistor 610 as a source follower transistor (SF). The photodetector 602 can be an electron-based photodiode or a hole based photodiode. It should be noted that the term photodetector as used herein is meant to encompass substantially any type of photon or light detecting component, such as a photodiode, pinned photodiode, photogate, or other photon sensitive region. Additionally, the term sense region as used herein is meant to encompass substantially any type of charge storing or charge converting region.

Those skilled in the art will recognize that the pixel 600 can be implemented with additional or different components in other embodiments. For example, a row select transistor can be omitted and a pulsed power supply mode used to select the pixel, the sense region can be shared by multiple photodetectors and transfer transistors, or the reset and readout transistors can be shared by multiple photodetectors, transfer gates, and sense regions.

When an image is to be captured, an integration period for the pixel begins and the photodetector 602 accumulates photo-generated charge in response to incident light. When the integration period ends, the accumulated charge in the photodetector 602 is transferred to the sense region 606 by selectively pulsing the gate of the transfer transistor 604. Typically, the reset transistor 608 is used to reset the voltage on the sense region 606 (node 616) to a predetermined level prior to the transfer of charge from the photodetector 602 to the sense region 606. When charge is to be readout of the pixel, the gate of the row select transistor is pulsed through the row select 512 and row select line 514 to select the pixel (or row of pixels) for readout. The readout transistor 610 senses the voltage on the sense region 606 and the row select transistor 612 transmits the voltage to the output line 510. The output line 510 is connected to readout circuitry (and optionally an image processor) through the output line 510 and the column select 508.

In some embodiments, an image capture device, such as a camera, may not include a shutter over the lens, and so the image sensor may be constantly exposed to light. In these embodiments, the photodetectors may have to be reset or depleted before a desired image is to be captured. Once the charge from the photodetectors has been depleted, the transfer gate and the reset gate are turned off, isolating the photodetectors. The photodetectors can then begin integration and collecting photo-generated charge.

Figure 7:
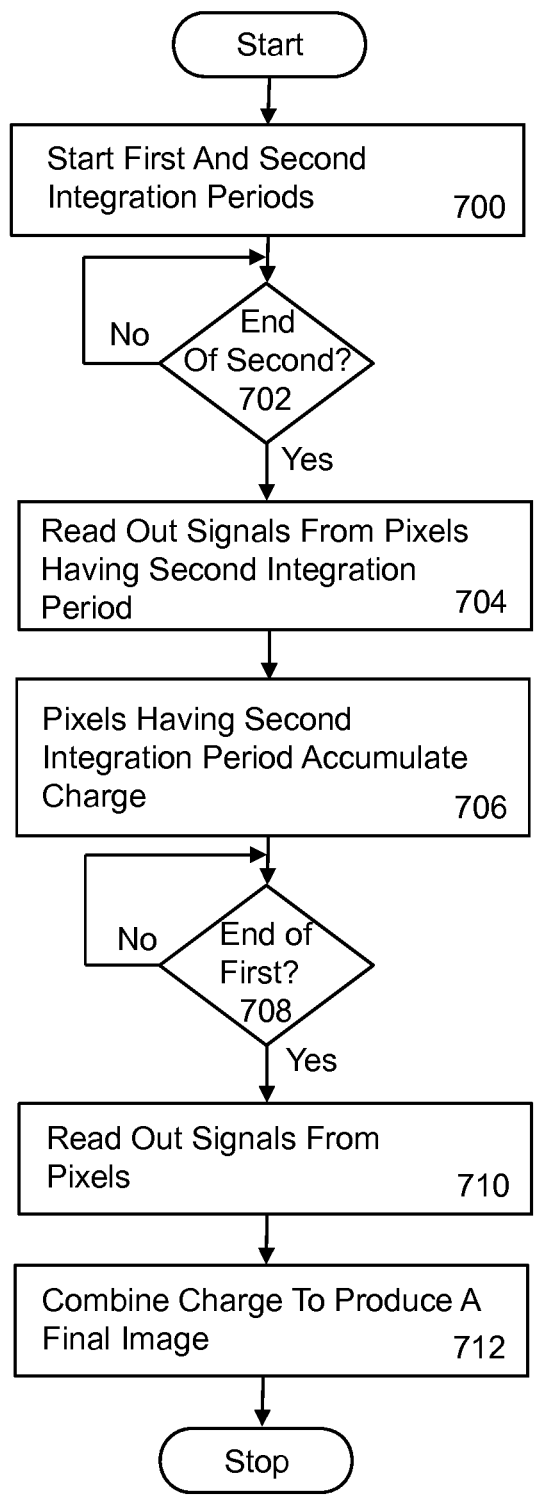
FIG. 7 is a flowchart of one method for capturing an image with pixels having different integration periods.

Referring now to FIG. 7, there is shown a flowchart of one method for capturing an image with pixels having different integration periods. Initially, as shown in block 700, the first and second integration periods begin and all of the pixels in the image sensor begin accumulating charge. A first portion of the pixels accumulate charge during a first integration period while a second portion of pixels accumulate charge during a shorter second integration period. The first and second portions can include substantially the same number of pixels, or the portions can include a different number of pixels.

A determination can then be made at block 702 as to whether or not it is the end of the second integration period. If not, the method waits until the second integration period ends. At the end of the second integration period, the process passes to block 704 where charge is read out of the pixels having the second integration period. The pixels associated with the second integration period begin accumulating charge again at block 706.

Next, as shown in block 708, a determination is made as to whether or not it is the end of the first integration period. If not, the method waits until the first integration period ends. At the end of the first integration period, charge is read out of all of the pixels (block 710), the pixels having the first integration period and the pixels having the second integration period. The charge read out at blocks 704 and 710 can then be combined at block 712 to produce a final image and the method ends.

Figure 8:
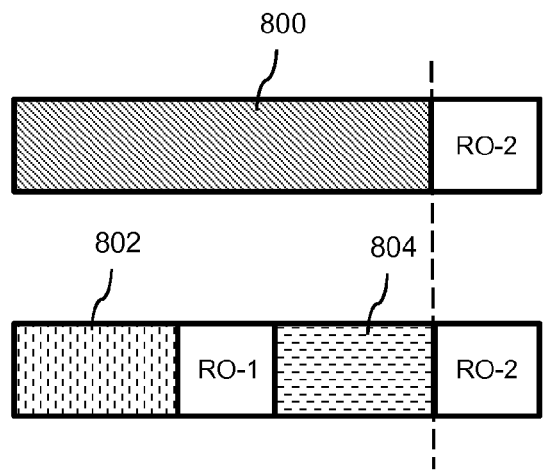
FIG. 8 illustrates graphically the method shown in FIG. 7.

FIG. 8 illustrates graphically the method shown in FIG. 7. A first portion of the pixels have a first integration period 800, while a second portion of the pixels have two shorter second integration periods 802, 804. The shorter integration periods 802, 804 both occur during the first integration period 800. At the end of the second integration period 802, the signals are read out of the pixels associated with the second integration period during a first readout period RO-1. The pixels having the second integration period then being accumulating charge again during the integration period 804. At the end of the first integration period 800, the signals in all of the pixels are read out during a second readout period RO-2. The second readout period RO-2 is the first time signals are read out of the pixels having the first integration period and the second time signals are read out of the pixels associated with the second integration period.

Figure 9A:
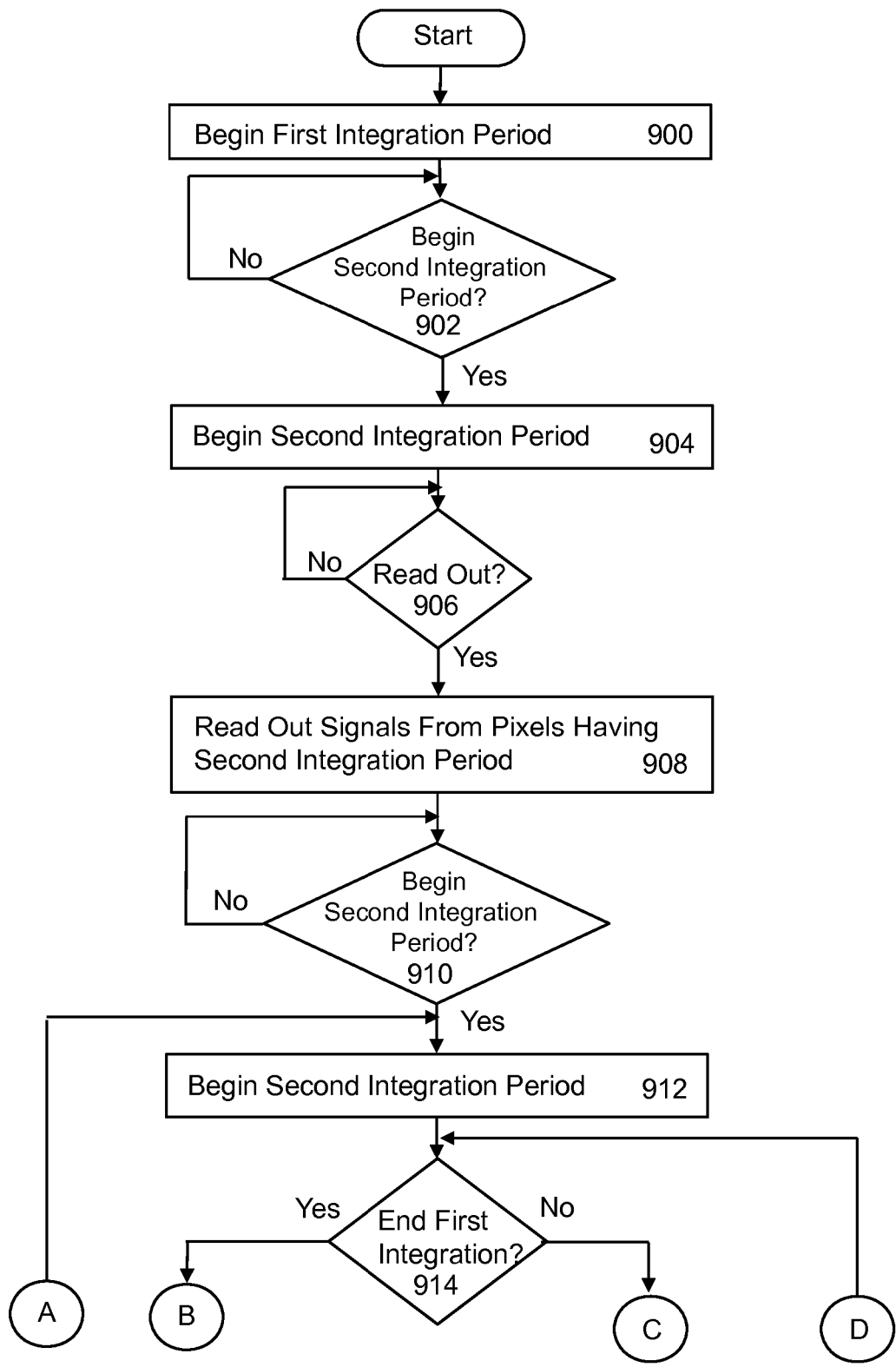
FIGS. 9A-9B is a flowchart of another method for capturing an image with pixels having different integration periods.
Figure 9B:
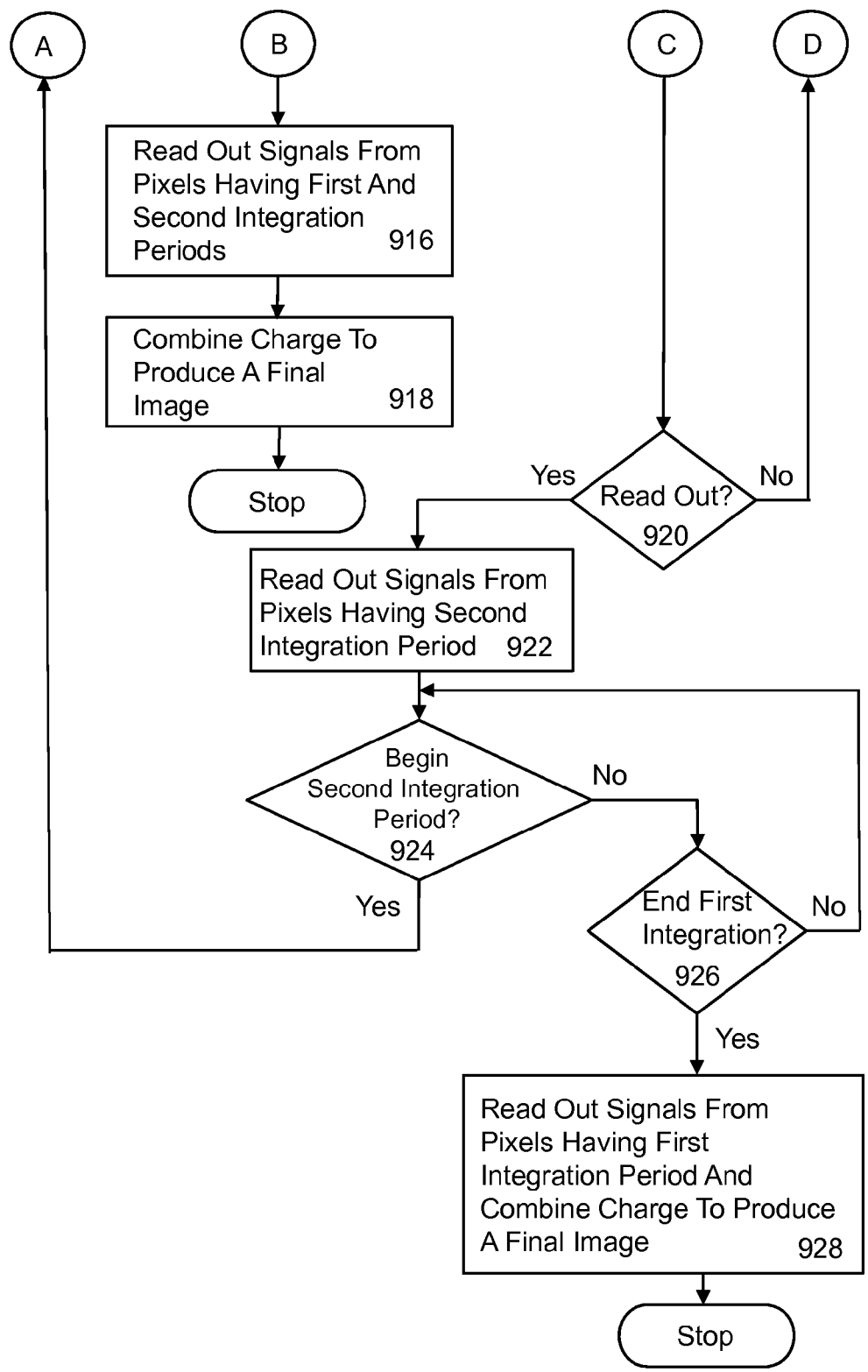

Referring now to FIGS. 9A-9B, there is shown a flowchart of another method for capturing an image with pixels having different integration periods. The method in FIG. 9 can be more flexible in that the pixels having the shorter second integration period can be read out two or more times and the start of the second integration periods can begin at selected times. Initially, as shown in block 900, the first integration period starts and the pixels associated with the first integration period in the image sensor begin accumulating charge. A determination can then be made at block 902 as to whether or not the second integration period is to begin. If not, the process waits until the second integration period is to begin. When the second integration period is to start, the method passes to block 904 where the second integration period begins and the pixels associated with the shorter second integration period being accumulating charge.

A determination is then made at block 906 as to whether or not a readout operation is to be performed on the pixels having the shorter second integration period. If not, the method waits until a readout operation is to be performed. When the signals in the pixels having the second integration period are to be read out, the process passes to block 908 where the accumulated charge is read out of the pixels having the second integration period.

A determination can then be made at block 910 as to whether or not another second integration period is to begin. If not, the process waits until the second integration period is to begin. When the second integration period is to start, the method passes to block 912 where the second integration period begins and the pixels associated with the shorter second integration period being accumulating charge. A determination can then be made at block 914 as to whether or not it is the end of the first integration period. If it is the end of the first integration period, the charge in the pixels having both long and short integration periods is read out at block 916. The charge read out at blocks 908 and 916 is then combined at block 918 to produce a final image and the method ends.

If it is not the end of the first integration period at block 914, the method passes to block 920 where a determination is made as to whether or not a readout operation is to be performed on the pixels having the shorter second integration period. If not, the method returns to block 914. If the signals in the pixels having the second integration period are to be read out, the process passes to block 922 where the accumulated charge is read out of the pixels having the second integration period.

A determination can then be made at block 924 as to whether or not another second integration period is to begin. If so, the process returns to block 912. If a second integration period will not begin, the method continues at block 926 where a determination can be made as to whether or not it is the end of the first integration period. If not, the process returns to block 924. If it is the end of the first integration period, the accumulated charge is read out of the pixels having the first integration period. All of the charge read out of the pixels (both first and second integration periods) is then combined at block 928 to produce a final image and the method ends.

Figure 10:
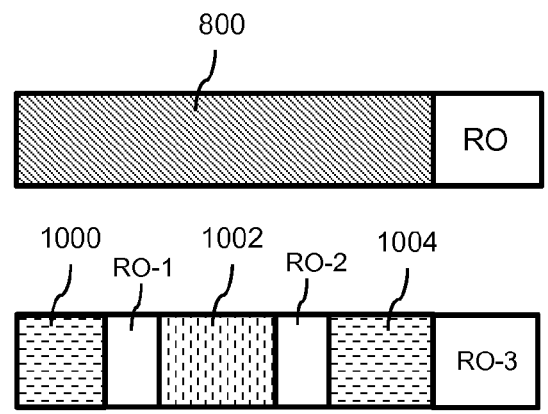
FIG. 10 depicts one example integration periods for the method shown in FIG. 9.

FIG. 10 depicts one example integration periods for the method shown in FIG. 9. A first integration period 800 is associated with a first portion of the pixels in an image sensor. The charge is read out (RO) of these pixels at the end of the first integration period. A second portion of the pixels in the image sensor accumulate charge for shorter second integration periods during the first integration period 800. In the illustrated embodiment, the second integration period 1000 begins at the start of the first integration period 800. The charge in the pixels having the second integration period is read out during a first readout operation (RO-1). The pixels associated with the second integration period begin accumulating charge during another second integration period 1002, followed by a second readout operation (RO-2). The pixels having the second integration period begin accumulating charge during another second integration period 1004, followed by a third readout operation (RO-3). In the illustrated embodiment, the third readout operation RO-3 occurs substantially simultaneously with the readout operation RO for the pixels having the first integration period.

Figure 11:
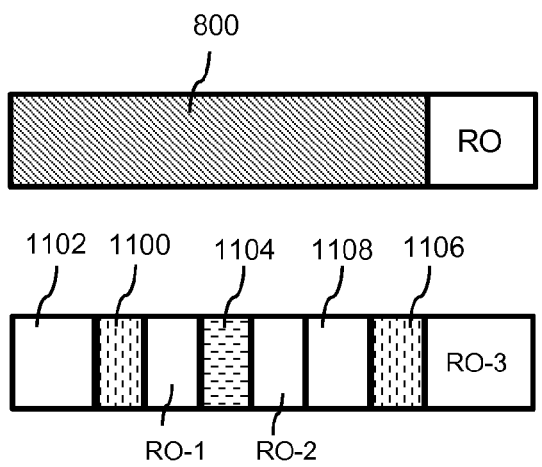
FIG. 11 illustrates other example integration periods for the method shown in FIG. 9.

FIG. 11 illustrates other example integration periods for the method shown in FIG. 9. A first integration period 800 is associated with a first portion of the pixels in an image sensor. The charge is read out (RO) of these pixels at the end of the first integration period. A second portion of the pixels in the image sensor accumulate charge for shorter second integration periods that occur during the first integration period 800. In the illustrated embodiment, the second integration period 1100 begins after the start of the first integration period 800. The pixels can accumulate charge during the time period 1102 between the start of the first integration period 800 and the start of the second integration period 1100, but this charge is not read out. Instead, in some embodiments, the pixels having the second integration period are reset to a known signal or voltage level just before the second integration period 1100 begins.

The charge in the pixels having the second integration period is read out during a first readout operation (RO-1). The pixels associated with the second integration period begin accumulating charge during another second integration period 1104, followed by a second readout operation (RO-2). The pixels having the second integration period can accumulate charge during another second integration period 1106, followed by a third readout operation (RO-3). The pixels can accumulate charge during the time period 1108 between the end of the second readout operation RO-2 and the start of the second integration period 1106, but this charge may not be read out. The pixels having the second integration period may be reset to a known signal or voltage level just before the start of the second integration period 1106.

Figure 12:
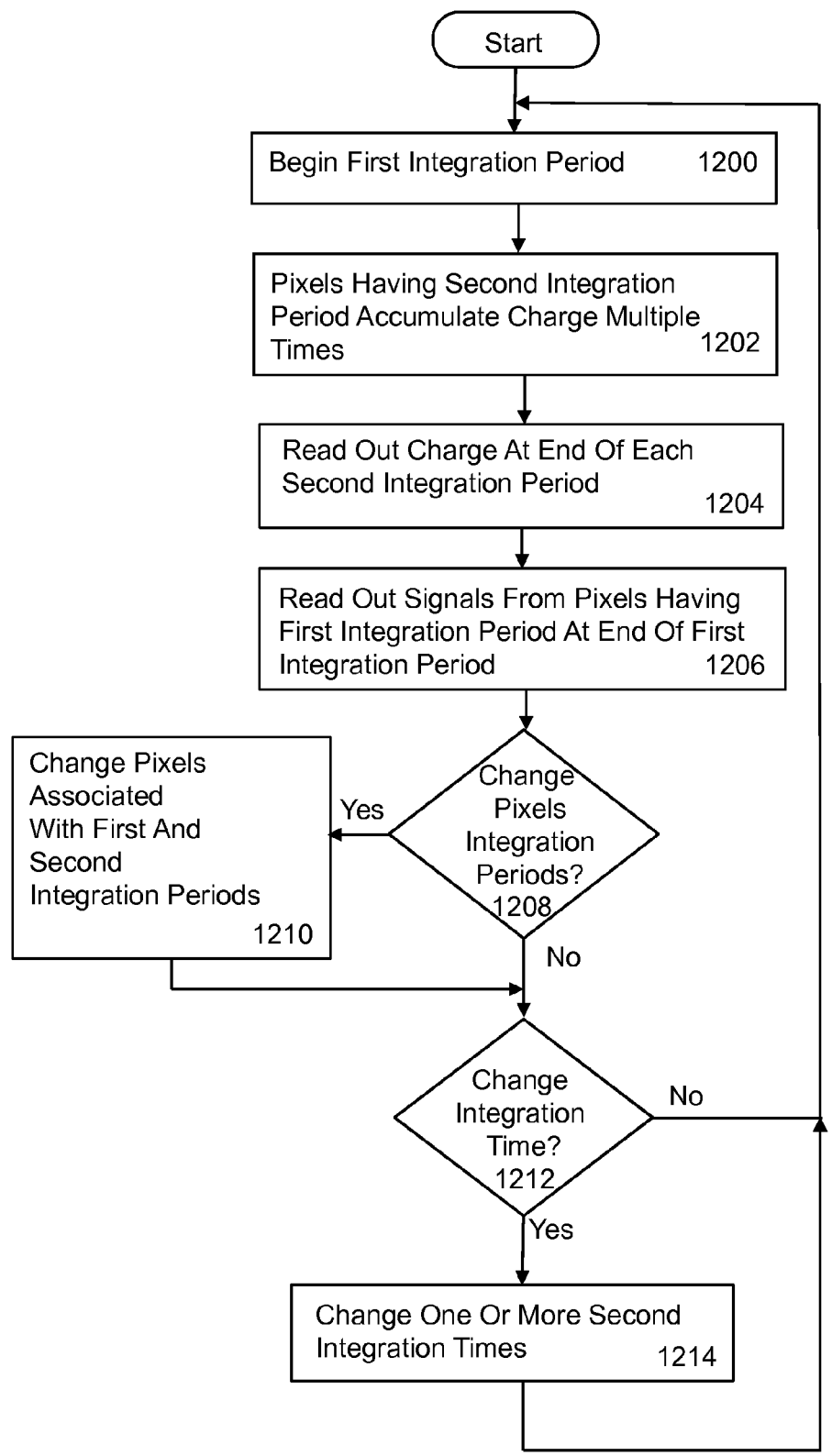
FIG. 12 is a flowchart of a method for varying the integration time of the pixels.

Referring now to FIG. 12, there is shown a flowchart of a method for varying the integration times of the pixels. Initially, a first integration period begins at block 1200. The pixels associated with the first integration period begin accumulating charge at the start of the first integration period. The pixels having the shorter second integration periods accumulate charge multiple times during the first integration period (block 1202). Charge is read out of the pixels having the second shorter integration at the end of each second integration period (block 1204). The charge is read out of the pixels associated with the first integration period at the end of the first integration period (block 1206). A readout operation on the pixels having the second integration period can be performed substantially simultaneously with the readout operation on the pixels associated with the first integration period. Alternatively, the readout operations can occur at distinct or overlapping time periods.

A determination can then be made at block 1208 as to whether or not the pixels associated with the first and second integration periods are to change. If so, the method passes to block 1210 where the first and second integration periods are associated with different pixels. For example, the pixels that were associated with the first integration period can be assigned the shorter second integration periods and vice versa. Alternatively, the distribution or arrangement of the pixels having the first and second integration periods can be adjusted, such that some or all of the pixels have a new integration period. A processor, such as processor 502 in FIG. 5, can be adapted to adjust the pixels associated with the first and second integration periods.

If the pixels associated with the first and second integration periods change, or do not change, the process continues at block 1212 where a determination is made as to whether or not an amount of time of one or more second integration periods is to be changed. If not, the process returns to block 1200. When an amount of time for at least one second integration period is to be adjusted, the method continues at block 1214 where the amount of time is changed. The process then returns to block 1200.

The amount of time in the second integration periods can be the same in some embodiments. In other embodiments, the amount of time in at least one second integration period that occurs during a first integration period can be different from an amount of time in another second integration period occurring during the same first integration period. In other words, the amount of time for each second integration period can vary during a single first integration period. The amount of time for one or more second integration periods can be adjusted periodically or at select times.

In another embodiment, the number of second integration periods can be pre-set depending on the frame rate, readout speed, and the amount of memory available to the image sensor. In such embodiments, the determination as to whether or not it is the end of the first integration period can be omitted. For example, blocks 914, 916, and 918 can be omitted. The method can pass from block 912 to block 920, and the "No" path for block 920 can be similar to the "No" path in block 906. Additionally, the determination in block 926 can be changed from a determination as to whether or not it is the end of the first integration period to a determination as to whether or not a readout operation is to be performed.

Figure 13:
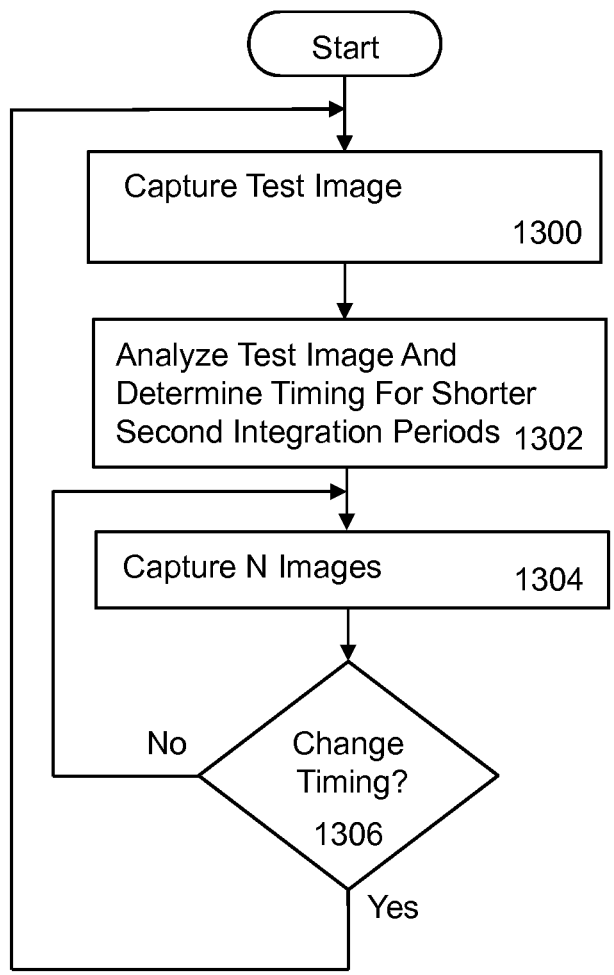
FIG. 13 is a flowchart of a method for determining the timing for the shorter second integration periods.

FIG. 13 is a flowchart of an example method for determining the timing for the shorter second integration periods. The timing of one or more second integration periods can change periodically or at select times. Initially, as shown in block 1300, one or more test images can be captured. The one or more test images can be captured using pixels having the first integration period and a default shorter second integration period. At least one test image is then analyzed and an amount of time for one or more second integration periods, as well as the start times for the second integration periods can be determined based on the analysis of the test image (block 1302). Next, as shown in block 1304, N images are captured using the first integration period for a portion of the pixels in the image sensor and the determined shorter second integration period for another portion of the pixels. N is an integer equal to or greater than one. After at least one image is captured, a determination can be made at block 1308 as to whether the timing of the second integration periods is to be changed. If not, the process returns to block 1304. If the timing is to be changed, the method returns to block 1300.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. An imaging system, comprising:
   an image sensor having a plurality of pixels, wherein
   a first portion of the pixels accumulate charge for a first integration period; and
   a second portion of the pixels accumulate charge for a shorter second integration period, wherein the second portion of the pixels having the shorter second integration period accumulate charge two or more times during the first integration period;
   readout circuitry operatively connected to the plurality of pixels;
   a storage device operatively connected to the readout circuitry; and
   a processor operatively connected to the readout circuitry and to the storage device, wherein the processor is configured to:
      at an end of at least one second integration time, enable the readout circuitry to read first pixel data from each pixel in the second portion of the pixels;
      store the first pixel data in the storage device;
      at an end of the first integration period, enable the readout circuitry to read second pixel data from each pixel in the second portion of the pixels and read out third pixel data from each pixel in the first portion of the pixels; and
      combine the first, the second, and the third pixel data to produce an image.

2. The imaging system as in claim 1, wherein the processor is adapted to adjust which pixels are associated with the first and second integration periods.

3. The imaging system as in claim 1, wherein the processor is adapted to determine an amount of time for each second integration period.

4. A method for capturing an image, the method comprising:
   beginning a first integration period for a first portion of pixels in an image sensor;
   beginning a second integration period for a second portion of pixels in the image sensor, wherein the second integration period is shorter than the first integration period;
   reading out first pixel data from the pixels in the second portion of the pixels during the first integration period at the end of the second integration period;
   storing the first pixel data;
   beginning another second integration period for the second portion of the pixels;
   reading out second pixel data from the pixels in the second portion of the pixels at the end of the first integration period;
   reading out third pixel data from the pixels in the first portion of the pixels at the end of the first integration period; and
   combining the first, the second, and the third pixel data to produce the image.

5. The method as in claim 4, wherein the second integration periods include substantially a same amount of time.

6. The method as in claim 4, wherein an amount of time in one second integration period differs from an amount of time in another second integration period.

7. The method as in claim 4, further comprising changing which pixels are associated with the first and second integration periods.

8. A method for capturing an image, the method comprising:
   beginning a first integration period for a first plurality of pixels in an image sensor;
   during the first integration period, beginning a plurality of second integration periods for a second plurality of pixels in the image sensor, wherein each second integration period is shorter than the first integration period and each second integration period begins at a distinct time within the first integration period;
   at the end of each second integration period, reading out first pixel data from each pixel in the second plurality of pixels;
   at the end of the first integration period, reading out second pixel data from each pixel in the first plurality of pixels and from each pixel in the second plurality of pixels; and
   combining the first and the second pixel data to produce the image.

9. The method as in claim 8, wherein the second integration periods include is substantially a same amount of time.

10. The method as in claim 8, wherein an amount of time in one second integration period differs from an amount of time in another second integration period.

11. The method as in claim 8, further comprising prior to beginning the plurality of second integration periods, determining timing for the plurality of second integration periods.

12. The method as in claim 11, wherein determining timing for the plurality of second integration periods comprises:
   capturing one or more test images; and
   analyzing at least one test image to determining timing for the plurality of second integration periods.

13. The method as in claim 12, further comprising:
   capturing N images, where N is an integer equal to or greater than one;
   determining whether the timing for the plurality of second integration periods is to change after the N images have been captured; and
   when the timing changes, changing the timing for at least one second integration period in the plurality of second integration periods.

14. The method as in claim 8, further comprising changing which pixels are associated with the first and second integration periods.

15. The method as in claim 8, further comprising storing the first signals read from the pixels in the second plurality of pixels.

* * * * *